(12) United States Patent
Nakamura

(10) Patent No.: US 9,851,626 B2
(45) Date of Patent: Dec. 26, 2017

(54) CONVERTER LENS SYSTEM

(71) Applicant: SONY CORPORATION, Tokyo (JP)

(72) Inventor: Akira Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/627,173

(22) Filed: Feb. 20, 2015

(65) Prior Publication Data

US 2015/0248050 A1    Sep. 3, 2015

(30) Foreign Application Priority Data

Mar. 3, 2014  (JP) .................................. 2014-040763

(51) Int. Cl.
| | |
|---|---|
| *G03B 17/48* | (2006.01) |
| *G02B 9/12* | (2006.01) |
| *G02B 15/10* | (2006.01) |
| *G02B 15/04* | (2006.01) |
| *G02B 9/02* | (2006.01) |
| *G02B 9/04* | (2006.01) |
| *G03B 17/56* | (2006.01) |
| *G02B 13/00* | (2006.01) |

(52) U.S. Cl.
CPC ............. *G03B 17/565* (2013.01); *G02B 9/02* (2013.01); *G02B 9/04* (2013.01); *G02B 9/12* (2013.01); *G02B 13/0035* (2013.01); *G02B 15/04* (2013.01); *G02B 15/10* (2013.01); *G03B 17/48* (2013.01)

(58) Field of Classification Search
CPC ... G02B 9/12; G02B 9/34; G02B 9/36; G02B 9/60; G02B 9/62; G02B 9/64; G02B 13/0035; G02B 13/004; G02B 13/0045; G02B 15/08; G02B 15/10; G02B 15/04; G02B 9/02; G02B 9/04; G03B 17/48; G03B 17/565; G03B 17/58; G03B 13/32
USPC .................................................. 359/675, 674
See application file for complete search history.

(56) References Cited

U.S. PATENT DOCUMENTS

| | | | | |
|---|---|---|---|---|
| 3,604,786 A | * | 9/1971 | Baker .................... | G02B 15/00 359/708 |
| 4,749,263 A | * | 6/1988 | Taniguchi .............. | G02B 15/08 359/675 |
| 4,812,911 A | * | 3/1989 | Ohshima .............. | H04N 5/2254 348/265 |
| 4,929,068 A | * | 5/1990 | Tsuji ..................... | G02B 15/10 359/673 |

(Continued)

FOREIGN PATENT DOCUMENTS

| | | |
|---|---|---|
| JP | 2002-287025 A | 10/2002 |
| JP | 2005-107261 A | 4/2005 |
| JP | 2006-349904 A | 12/2006 |

OTHER PUBLICATIONS

"RefractiveIndex.info" website, Mikhail Polyanskiy, 2008.*

*Primary Examiner* — Jordan Schwartz
(74) *Attorney, Agent, or Firm* — Chip Law Group

(57) ABSTRACT

There is provided converter lens system including a first lens that is a negative lens of which both surfaces are concave, a second lens that is a negative lens of which both an image plane side and an object side are convex toward an object side, and a third lens that is a positive lens of which both sides are convex. The first to third lenses are disposed in this order from the object side, and the converter lens system is inserted and used between an imaging lens and a camera.

5 Claims, 6 Drawing Sheets

(56) References Cited

U.S. PATENT DOCUMENTS

| | | | | |
|---|---|---|---|---|
| 4,976,526 A * | 12/1990 | Oshima | ............... | G02B 13/02 |
| | | | | 359/737 |
| 5,013,142 A * | 5/1991 | Rollin | ............... | G02B 15/10 |
| | | | | 359/674 |
| 6,069,736 A * | 5/2000 | Ishii | ............... | G02B 27/646 |
| | | | | 359/434 |
| 6,288,847 B1 * | 9/2001 | Tsutsumi | ............... | G02B 15/10 |
| | | | | 359/675 |
| 2002/0191302 A1 * | 12/2002 | Tsutsumi | ............... | G02B 15/10 |
| | | | | 359/675 |
| 2015/0346465 A1 * | 12/2015 | Yonezawa | ............... | G02B 15/12 |
| | | | | 359/675 |

* cited by examiner

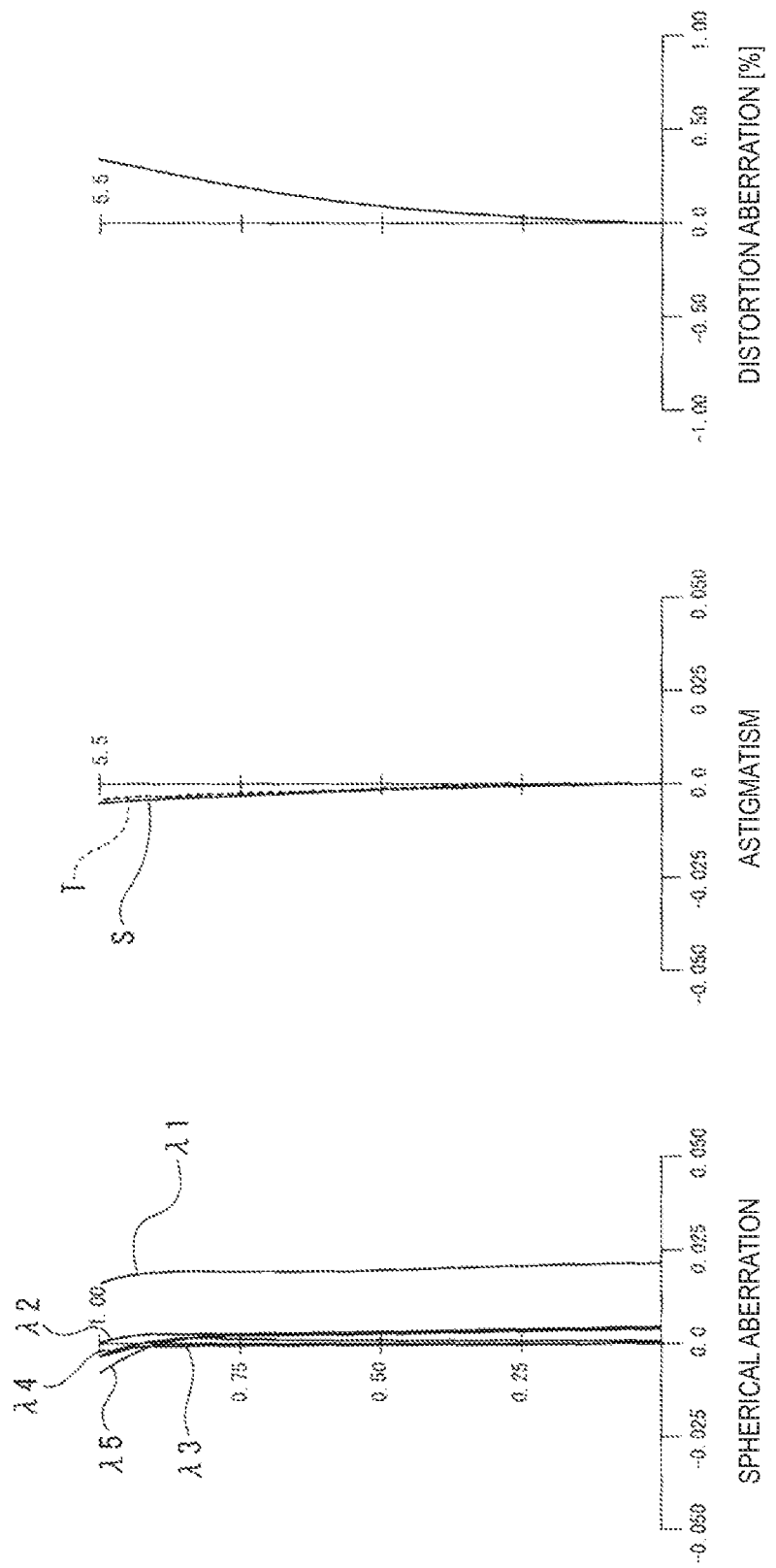

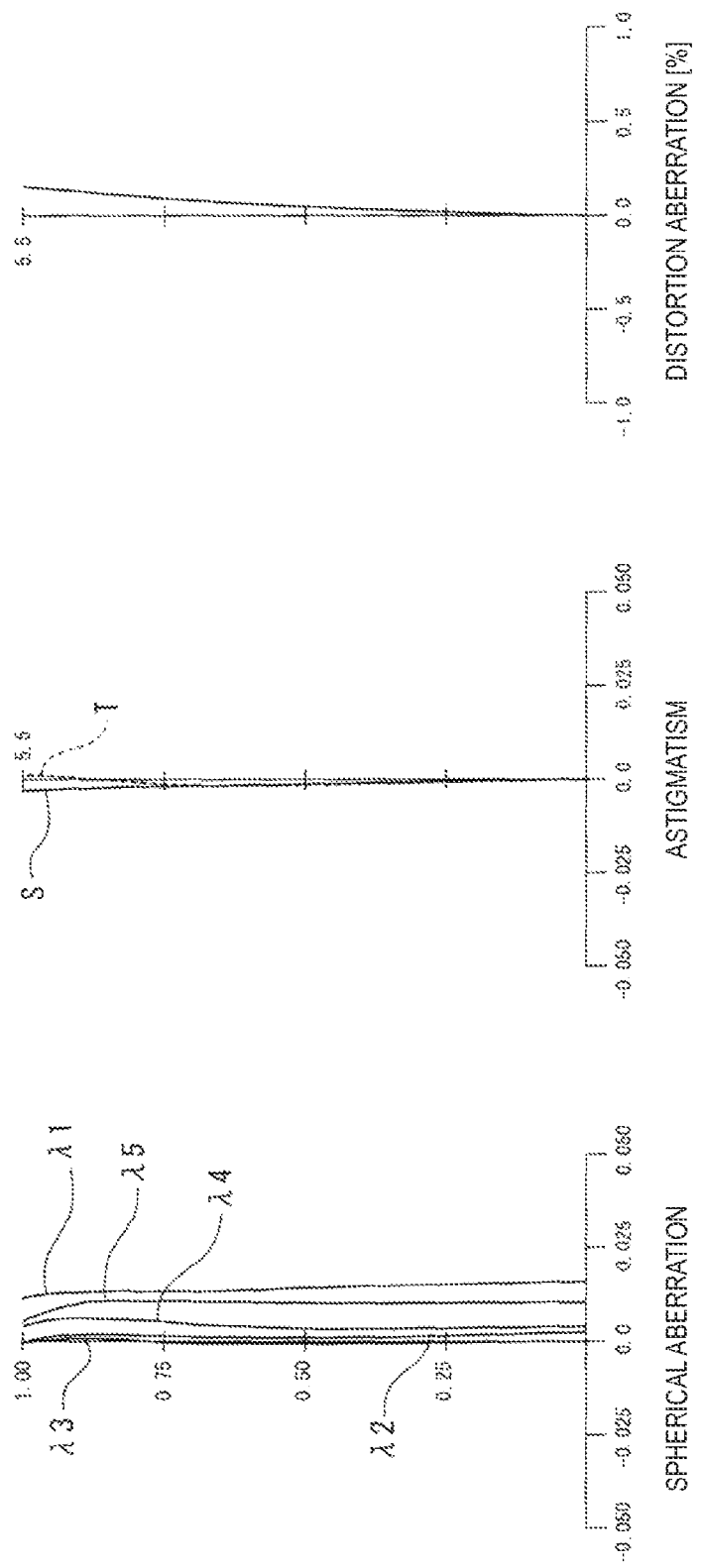

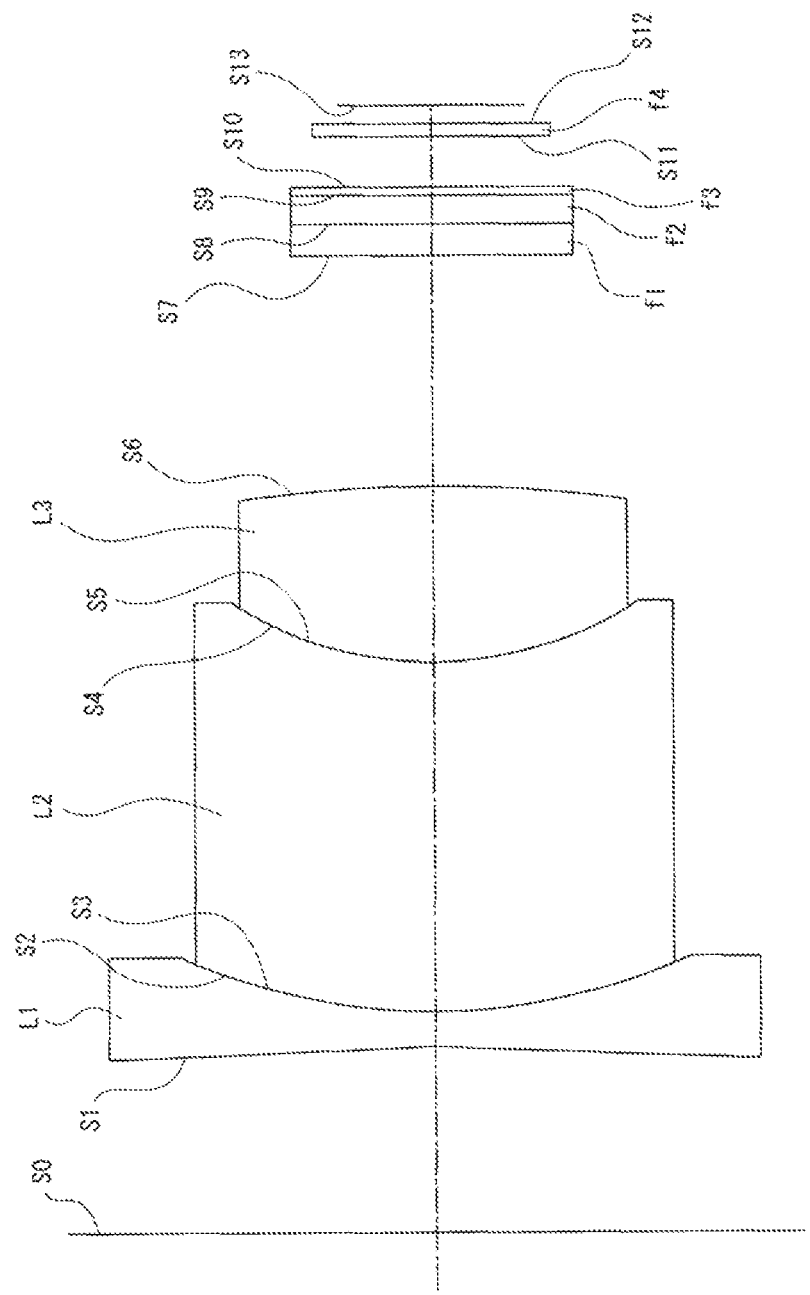

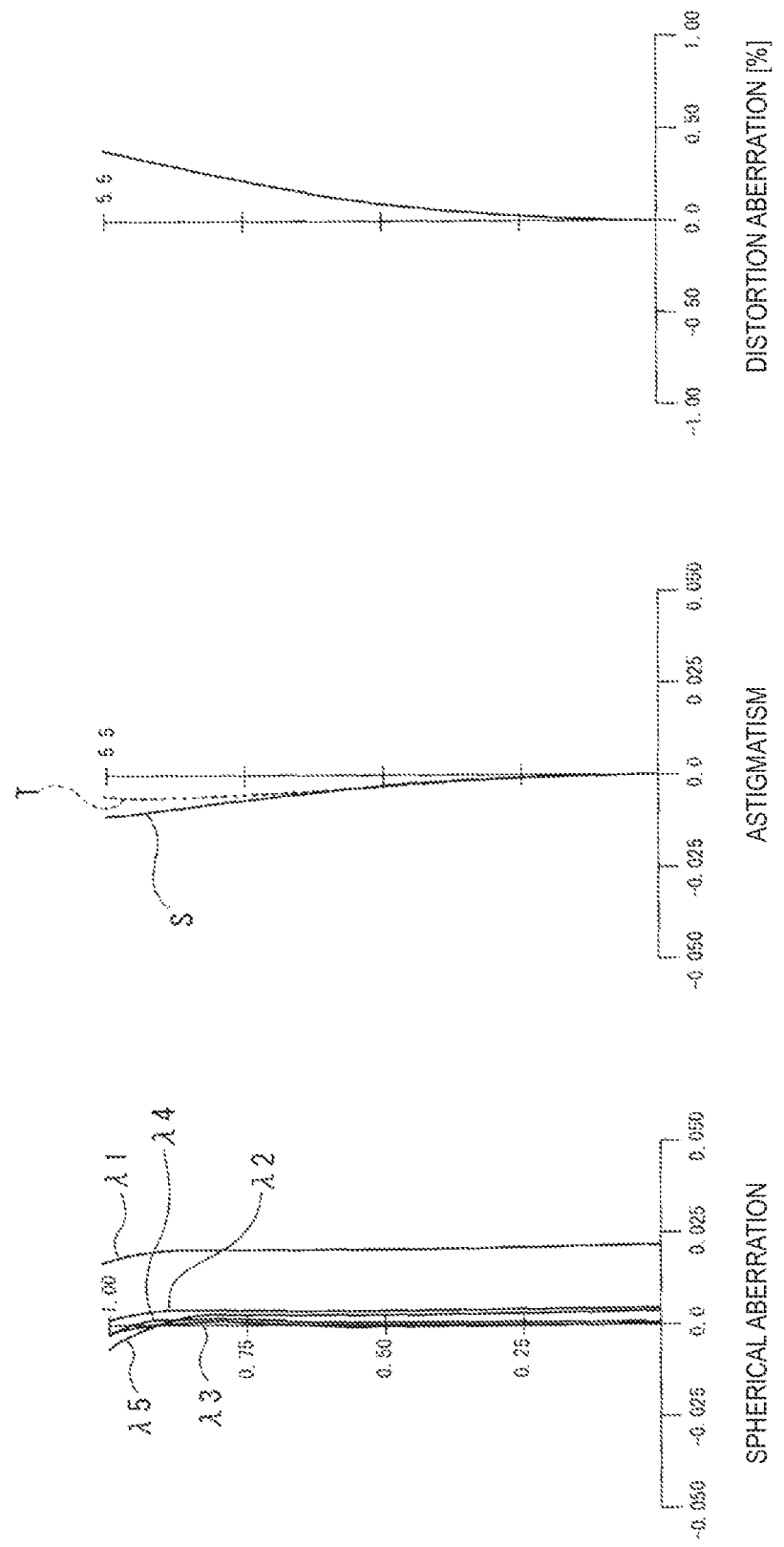

CONVERTER LENS SYSTEM

CROSS REFERENCE TO RELATED APPLICATIONS

This application claims the benefit of Japanese Priority Patent Application JP 2014-040763 filed Mar. 3, 2014, the entire contents of which are incorporated herein by reference.

BACKGROUND

The present technology relates to a technical field of a converter lens system that is inserted and used between an imaging lens and a camera.

For example, as disclosed in JP 2005-107261A, JP 2006-349904A, and JP 2002-287025A, there are known converter lens systems that are inserted and used between an imaging lens and a camera.

In JP 2005-107261A, JP 2006-349904A, and JP 2002-287025A, the converter lens systems for performing enlargement or reduction are disclosed. However, as the application of the converter lens systems, the application enabling the combined use of an imaging lens and a camera having different standards is also desired.

For example, regarding a color video camera for business purposes, there is a demand for using an imaging lens corresponding to a ⅔-inch standard of a three-plate type camera having three image sensors (standard based on the assumption of an image sensor of a ⅔-inch size) in a camera that has the same ⅔-inch standard but is a single-plate type, and a converter lens system for responding to this is desired.

SUMMARY

Here, for example, in the standard of the three-plate type camera, since the three-plate type camera includes a color separation prism, the imaging lens corresponding to the relevant standard is designed on the assumption that the camera includes the color separation prism. Therefore, if the imaging lens for the three-plate type camera is used in combination with the single-plate type camera including no color separation prism, various aberrations, including spherical aberration, occurs due to the absence of the color separation prism that should be originally present.

In order to suppress the occurrence of such spherical aberration, it may be considered to insert a prism equivalent to the color separation prism, which is included in the three-plate type camera, between the imaging lens for the three-plate type camera and the single-plate type camera. However, according to this, a total length of the converter lens system is increased, making it difficult to achieve downsizing of the converter lens system.

In this way, in the converter lens system for enabling the combined use of the imaging lens and the camera having different standards, there is a case where it is difficult to achieve the miniaturization of the converter lens system when intending to maintain excellent optical performance in an imaging system in which the imaging lens, the converter lens system, and the camera are combined.

Therefore, the present technology is directed to overcome the above-described problems and achieve the miniaturization of the converter lens system while maintaining the excellent optical performance of the imaging system that uses the imaging lens and the camera having different standards through the converter lens system in combination.

First, according to an embodiment of the present disclosure, there is provided converter lens system including a first lens that is a negative lens of which both surfaces are concave, a second lens that is a negative lens of which both an image plane side and an object side are convex toward an object side, and a third lens that is a positive lens of which both sides are convex. The first to third lenses are disposed in this order from the object side, and the converter lens system is inserted and used between an imaging lens and a camera.

Therefore, due to a ratio of axial peripheral ray height on the object side surface of the first lens and the image plane side surface of the third lens, it is possible to generate a positive spherical aberration as the sum in the converter lens system.

Second, according to an embodiment of the present disclosure, the converter lens system is inserted and used between the imaging lens, which is designed on an assumption that the imaging lens is used in combination with a color separation prism included in a three-plate type camera having three image sensors, and the camera that is a single-plate type camera, preferably.

Therefore, the spherical aberration occurring when the imaging lens for the three-plate type camera and the single-plate type camera are used in combination can be corrected by the lens system alone.

Third, according to an embodiment of the present disclosure, the converter lens system substantially has no power, preferably.

Therefore, when the converter lens system is inserted and used between the imaging lens and the camera, the enlargement or reduction of the image does not substantially occur.

Fourth, according to an embodiment of the present disclosure, when fe represents a focal length for e-line of the converter lens system and H represents a maximum image height of an entire optical system when combined with the imaging lens, the converter lens system preferably satisfies:

$$H/|fe|<0.03$$

By satisfying the above condition, the power of the converter lens system is an appropriate value considering the variation tolerance of the power because even in the category of the same size standard, an image element having a slightly different effective region size exists and it is configured to perform an aberration correction by a lens system, without providing the prism.

Fifth, according to an embodiment of the present disclosure, the converter lens system preferably satisfies:

$$H/|fe|<0.01$$

Thus, the power of the converter lens system is a smaller value while being a value considering a difference or a power variation tolerance of the effective region size of the image sensor in the same size standard.

Sixth, according to an embodiment of the present disclosure, when R1 represents a radius of curvature of the object side of the first lens and H represents a maximum image height of an entire optical system when combined with the imaging lens, the converter lens system preferably satisfies:

$$-100<R1/H<-25$$

Accordingly, a spherical aberration for offsetting the spherical aberration generated by the imaging lens for the three-plate type camera is generated by the converter lens system.

Seventh, according to an embodiment of the present disclosure, when L represents a distance from an apex of the object side of the first lens to an apex of the image plane side of the third lens and H represents a maximum image height of an entire optical system when combined with the imaging lens, the converter lens system preferably satisfies:

$$L > 5 \times H$$

The lower limit "5×H" of the total length L is a value corresponding to a limit value of imaging performance degradation due to the astigmatism.

Eighth, according to an embodiment of the present disclosure, when BF represents back focus, which is an air conversion distance from an apex of an image plane side of the third lens to an image plane, and H represents a maximum image height of an entire optical system when combined with the imaging lens, the converter lens system preferably satisfies:

$$BF > 3 \times H$$

The lower limit "3×H" of the back focus BF is a value that is set considering various mount standards of the single-plate type camera having on color separation prism.

Ninth, according to an embodiment of the present disclosure, the converter lens system is preferably configured with a three-plate-bonded lens.

Due to the three-plate-bonded lens, the separation distance among the respective lenses L of the first lens, the second lens, and the third lens is shortened.

Also, due to the bonded lens, the position tolerance management of the respective lenses L on the assembly is alleviated, and there is an advantage that can reduce the problems, such as interfacial ghost or flare occurring in an interface with air.

Tenth, according to an embodiment of the present disclosure, when Nd1 represents a refractive index for d-line of the first lens and Nd3 represents a refractive index for d-line of the third lens, the converter lens system preferably satisfies:

$$|Nd1 - Nd3| < 0.05$$

In the converter lens system of the present embodiment in which the first lens being a negative lens of which both sides are concave, the second lens being a negative lens of which both the image plane side and the object side are convex toward the object side, and the third lens being a positive lens of which both surfaces are convex are arranged in this order from the object side, a magnification chromatic aberration is almost offset at two pairs (at two bonded surfaces in the case of the bonded lens), that is, a pair of the image plane side surface of the first lens and the object side surface of the second lens and a pair of the image plane side surface of the second lens and the object side surface of the third lens by make the refractive indexes of the first lens and the third lens equal to each other.

According to one or more embodiments of the present technology, it is possible to achieve the miniaturization of the converter lens system while maintaining the excellent optical performance of the imaging system that uses a combination of the imaging lens and the camera having different standards through the converter lens system.

Note that the effects described herein are not necessarily limited and may be one of the effects described in the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

BRIEF DESCRIPTION OF THE DRAWINGS

FIG. 3 is a longitudinal aberration diagram illustrating a spherical aberration, an astigmatism, and a distortion aberration (%) in a case where a converter lens system as a first embodiment is inserted;

FIG. 4 is a longitudinal aberration diagram illustrating a spherical aberration, an astigmatism, and a distortion aberration (%) in a case where an imaging lens for a three-plate type camera is combined with a three-plate type camera;

FIG. 5 is a diagram for explaining a lens configuration of a converter lens system as a second embodiment; and FIG. 6 is a longitudinal aberration diagram illustrating a spherical aberration, an astigmatism, and a distortion aberration (%) in a case where a converter lens system as a second embodiment is inserted.

DETAILED DESCRIPTION OF THE EMBODIMENT(S)

Note that description will be provided in the following order.
<1. Configuration of converter lens system>
<2. Embodiments>
[2-1. First embodiment]
[2-2. Second embodiment]
<3. Conclusion of Embodiments>
<4. Modification>
<5. Present technology>

1. CONFIGURATION OF CONVERTER LENS SYSTEM

Hereinafter, a converter lens system 1 as an embodiment of the present technology will be described with reference to the appended drawings.

Figure 1:
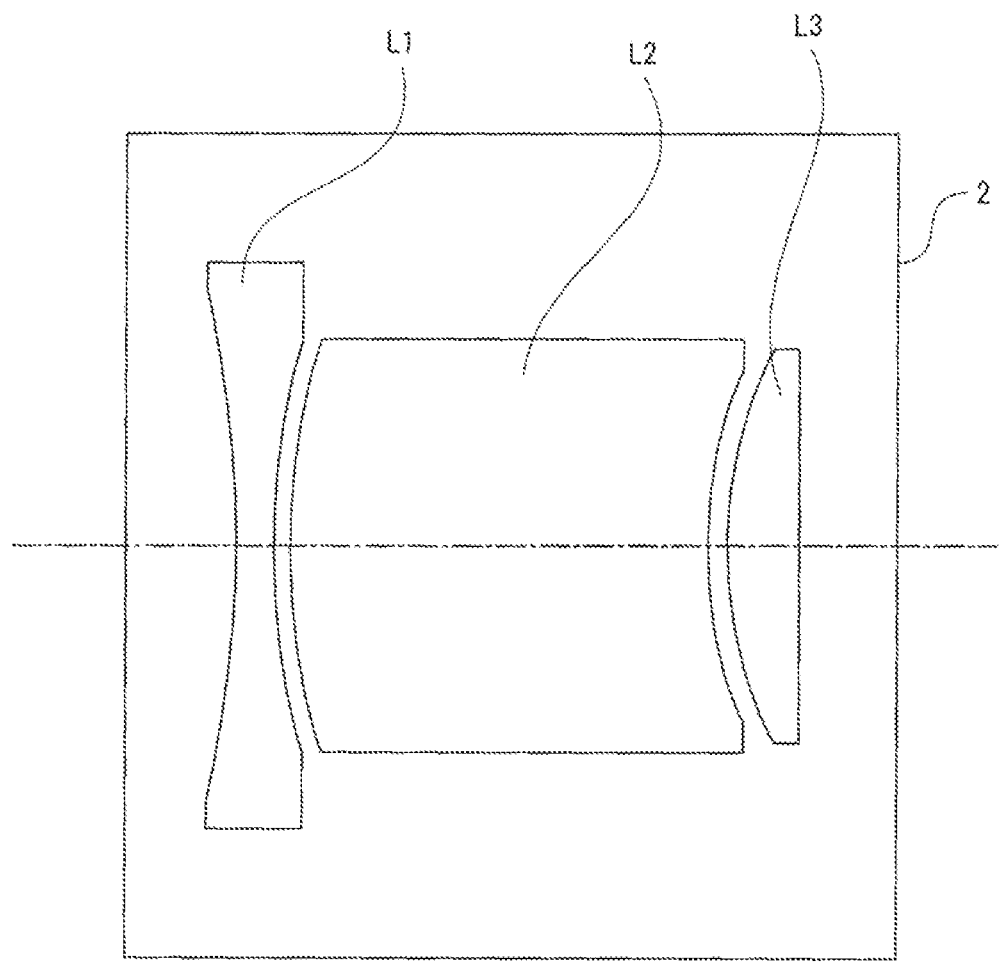
FIG. 1 is a schematic cross-sectional view of a converter lens system according to an embodiment.

FIG. 1 is a schematic cross-sectional view of a converter lens system 1.

In FIG. 1, a left side on the plane of paper is an object side, and a right side on the plane of paper is an image plane side.

The converter lens system 1 includes a substantially cylindrical lens barrel 2, and a first lens L1, a second lens L2, and a third lens L3, which are arranged in this order from an object side in the lens barrel 2.

Although not illustrated, the lens barrel 2 includes an object side connection portion formed at an end of the object side so as to detachably connect an imaging lens (master lens), and an image plane side connection portion formed at an end of the image plane side so as to detachably connect the converter lens system 1 to a camera. The converter lens system 1 is used in a state in which the imaging lens is connected to the object side connection portion and it is connected to the camera by the image plane side connection portion. That is, the converter lens system 1 is inserted and used between the imaging lens and the camera.

In the case of the present embodiment, the imaging lens, which is connected to the converter lens system 1, is an imaging lens designed on the assumption that the imaging lens is used in combination with a color separation prism included in a three-plate type camera having three image sensors (hereinafter, referred to as an "imaging lens for a three-plate type camera"). More specifically, the imaging lens is an imaging lens corresponding to a standard based on the assumption of an image sensor of a ⅔-inch size (hereinafter, referred to as a "⅔-inch standard") among imaging lenses for a three-plate type camera.

Also, similarly, the camera, which is connected to the converter lens system 1, is a single-plate type camera corresponding to a ⅔-inch standard.

Since the imaging lens, which is connected to the object side connection portion, is a master lens, the imaging lens emits converging light on the image plane side. That is, in the converter lens system 1, the converging light is incident from the object side.

In FIG. 1, the first lens L1 is a negative lens (a lens having a negative refractive power), of which both surfaces are concave. That is, the object side surface of the first lens L1 is convex toward the image plane side, and the image plane side surface of the first lens L1 is convex toward the object side.

The second lens L2 is a negative lens, of which both the object side surface and the image plane side surface are convex toward the object side.

The third lens L3 is a positive lens (a lens having a positive refractive power), of which both surfaces are convex. That is, the object side surface of the third lens L3 is convex toward the object side, and the image plane side surface of the third lens L3 is convex toward the image plane side.

A desired spherical aberration can be generated by a combination of the first lens L1, the second lens L2, and the third lens L3.

Specifically, since the converter lens system 1 has a diverging action by forming the object side surface of the first lens L1, which is disposed on the most object side, in a shape concave toward the object side (convex toward the image plane side), the converter lens system 1 generates a positive spherical aberration, and since the converter lens system 1 has a converging action by forming the image plane side surface of the third lens L3, which is disposed on the most image plane side, in a shape convex toward the image plane side, the converter lens system 1 generates a negative spherical aberration.

Furthermore, since the other surfaces, that is, the image plane side surface of the first lens L1, each surface of the second lens L2, and the object side surface of the third lens L3, are all convex toward the object side, it is possible to suppress the amount of aberration generated at these surfaces.

Therefore, due to a ratio of axial peripheral ray height on the object side surface of the first lens L1 and the image plane side surface of the third lens L3, it is possible to generate a positive spherical aberration as the sum in the converter lens system 1.

Hence, it is possible to generate a desired spherical aberration, without providing a prism equivalent to the color separation prism included in the three-plate type camera. That is, in a case where the converter lens system 1 is inserted and used between the imaging lens for the three-plate type camera and the single-plate type camera, it is possible to suppress the occurrence of the spherical aberration caused by the absence of the color separation prism in the single-plate type camera, and it is possible to maintain excellent optical performance.

Also, it is possible to make the converter lens system 1 substantially have no power by the offset of the diverging action by the first lens L1 and the second lens L2, both of which are the negative lenses, and the converging action by the third lens L3, which is the positive lens.

For example, as in the present example, in a case where both of the imaging lens and the camera correspond to the standard of the same image sensor size, it is undesirable that an image is unnecessarily enlarged or reduced by the insertion of the converter lens system 1. Therefore, in this case, it is desirable that the converter lens system 1 substantially has no power.

At this time, the power of the converter lens system 1 (reciprocal of a focal length) is preferably set to satisfy the following Formula 1, considering the variation tolerance of the power because even in the category of the same size standard, an image element having a slightly different effective region size exists, and furthermore, it is configured to perform an aberration correction by a lens system, without providing the prism.

$$H/|fe|<0.03 \qquad \text{[Formula 1]}$$

Here, fe is a focal length for e-line of the converter lens system 1, and H is a maximum image height of an entire optical system when combined with an imaging lens.

By satisfying the above condition, the power of the converter lens system 1 is an appropriate value considering the variation tolerance of the power because even in the category of the same size standard, an image element having a slightly different effective region size exists, and furthermore, it is configured to perform an aberration correction by a lens system, without providing the prism.

Therefore, it is possible to widen a corresponding width of the converter lens system 1 while suppressing the enlargement/reduction of the image.

More preferably, it is desirable that the power of the converter lens system 1 satisfies the following Formula 2.

$$H/|fe|<0.01 \qquad \text{[Formula 2]}$$

Thus, the power of the converter lens system 1 is a smaller value while being a value considering a difference or a power variation tolerance of the effective region size of the image sensor in the same size standard. Therefore, it is possible to realize the converter lens system 1 that further suppresses the enlargement/reduction of the image while securing the corresponding width of the converter lens system 1 to a certain degree.

Also, the shape of the object side surface of the first lens L1 is important in determining the amount of the spherical aberration occurring in the converter lens system 1.

In consideration of this point, in the present embodiment, the shape of the object side surface of the first lens L1 satisfies the following Formula 3.

$$-100<R1/H<-25 \qquad \text{[Formula 3]}$$

Here, R1 is a radius of curvature of the object side surface of the first lens L1.

Accordingly, a spherical aberration for offsetting the spherical aberration generated by the imaging lens for the three-plate type camera is generated by the converter lens system 1.

Thus, in a case where the converter lens system 1 is inserted and used between the imaging lens for the three-plate type camera and the single-plate type camera, it is possible to appropriately correct the spherical aberration generated by the imaging lens for the three-plate type camera.

Here, according to the converter lens system 1 of the present embodiment, it is possible to correct the spherical aberration occurring in the imaging lens for the three-plate type camera, without providing the prism, and it is possible to maintain excellent optical performance. Since the prism can be omitted, the total length of the converter lens system 1 can be made shorter than the case where the prism is used.

For example, in a B4 mount lens of a ⅔-inch standard of a three-plate type, there is a standard related to the length of the prism, and 46.2±0.5 mm is defined as a standard glass length. The maximum image height of the B4 mount lens of the ⅔-inch standard is 5.5 mm at the half the diagonal length of the effective region of the image sensor, and the ratio of the standard glass length is 8.4.

However, when the converter lens system 1 is excessively shortened, an astigmatism occurs at surfaces other than the object side surface of the first lens L1 and the image plane side surface of the third lens L3, and imaging performance is degraded.

Therefore, it is preferable that the total length L of the converter lens system 1, which is a distance from the apex of the first lens L1 on the object side to the apex of the third lens L3 on the image plane side, satisfies the following Formula 4.

$$5 \times H < L \quad \text{[Formula 4]}$$

The lower limit "5×H" of the total length L is a value corresponding to a limit value of imaging performance degradation due to the astigmatism.

Therefore, by satisfying the above condition, it is possible to realize the converter lens system 1 that achieves miniaturization by shortening the total length L while maintaining excellent imaging performance.

In Formula 4 above, the upper limit of the total length L may be set to "5×H<L<6.2×H". The upper limit is a value that can be advantageous in comparison with the case where the prism is used.

Furthermore, in the case of using the lens system as in the present example, the setting of the back focus also is an important factor. In the case of adopting a configuration that suppresses the occurrence of the spherical aberration by providing the prism, the position of the prism can be freely set between the imaging lens corresponding to the standard of the three-plate type camera and the single-plate type camera. However, in the case of configuring the lens system as in the present example, the position of the prism has to be previously incorporated in a design specification. In consideration of various mount standards of the single-plate type camera side, the back focus BF, which is an air conversion distance from the apex of the third lens L3 on the image plane side to the image plane, is configured to satisfy the following Formula 5.

$$BF > 3 \times H \quad \text{[Formula 5]}$$

In this way, it is possible to secure relatively long back focus that can cope with the mount standard of the single-plate type camera.

Also, from the viewpoint of suppression of aberration, it is preferable that a refractive index of the first lens L1 and a refractive index of the third lens L3 are set to satisfy the following Formula 6.

$$|Nd1 - Nd3| < 0.05 \quad \text{[Formula 6]}$$

Here, Nd1 is a refractive index in d-line of the first lens L1, and Nd3 is a refractive index in d-line of the third lens L3.

In the converter lens system 1 of the present embodiment in which the first lens L1 being a negative lens of which both sides are concave, the second lens L2 being a negative lens of which both the image plane side and the object side are convex toward the object side, and the third lens L3 being a positive lens of which both surfaces are convex are arranged in this order from the object side, a magnification chromatic aberration is almost offset at two pairs, that is, a pair of the image plane side surface of the first lens L1 and the object side surface of the second lens L2 and a pair of the image plane side surface of the second lens L2 and the object side surface of the third lens L3 by make the refractive indexes of the first lens L1 and the third lens L3 equal to each other. That is, it is possible to suppress the magnification chromatic aberration as the sum.

2. EMBODIMENTS

2-1. First Embodiment

Figure 2:
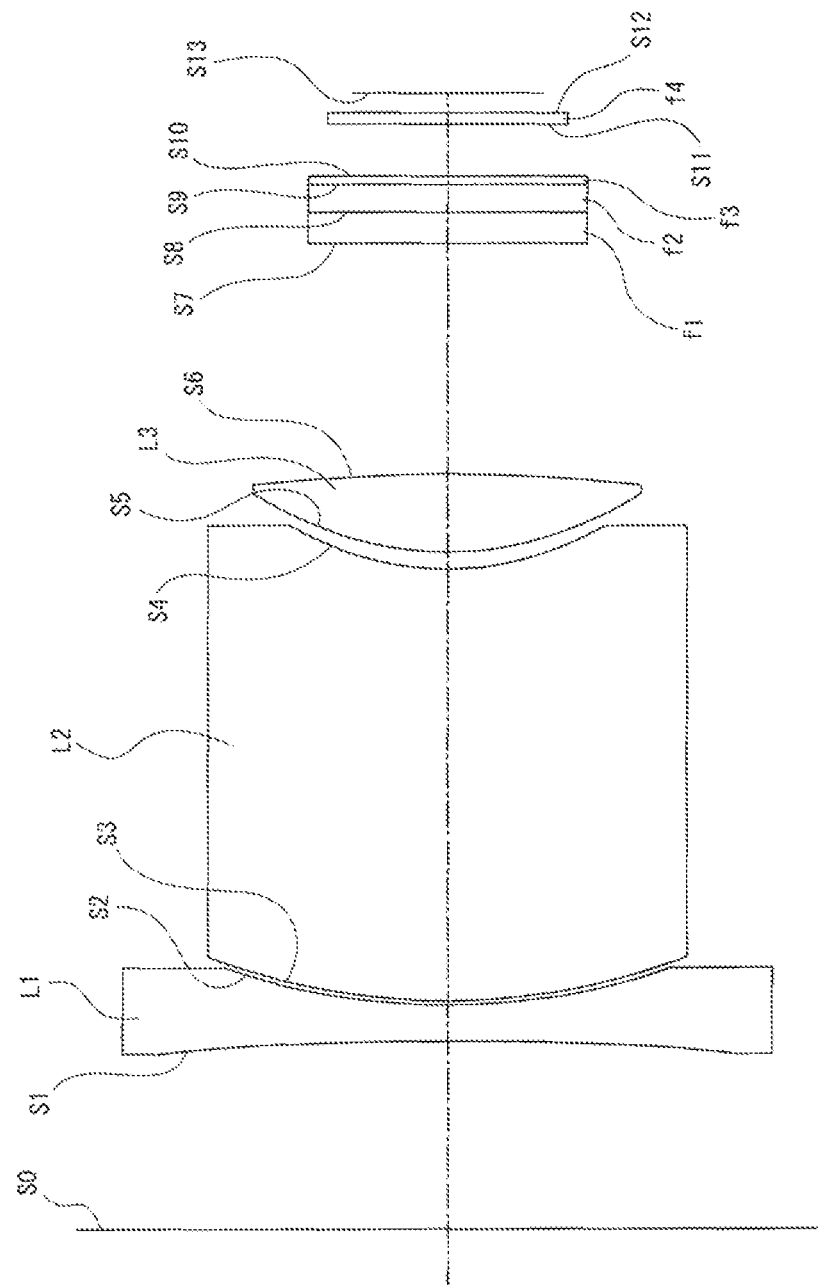
FIG. 2 is a diagram for explaining a lens configuration of a converter lens system as a first embodiment.

FIG. 2 is a diagram for explaining a lens configuration of a converter lens system 1 as a first embodiment.

In FIG. 2 (and FIG. 5 to be described below), on the assumption that the converter lens system 1 is connected to the single-plate type camera, various filters f1, f2, f3, and f4 provided on the single-plate type camera side are illustrated together with the first lens L1, the second lens L2, and the third lens L3. Such filters f1 to f4 are disposed in this order from the object side.

Also, in FIG. 2 (and FIG. 5), a mount surface S0 of an imaging lens in the converter lens system 1 and an imaging surface (image plane) S13 of the imaging lens included in the single-plate type camera are also illustrated, and surface numbers with symbol "S" are assigned to the respective surfaces disposed between the mount surface S0 and the imaging surface S13. The surface numbers are assigned in ascending order from the object side. In the respective lenses L and the filter f4 disposed at the most image plane side, surface numbers are assigned to the respective surfaces of the object side and the image plane side (S1 to S6, S11, S12). Since the filters f1 to f3 are bonded together, the mutual contact surfaces are treated as one common surface and surface numbers are assigned (S8, S9).

As illustrated in FIG. 2, in the converter lens system 1 as the first embodiment, the image plane side surface (S2) of the first lens L1 and the object side surface (S3) of the second lens L2, and the image plane side surface (S4) of the second lens L2, and the object side surface (S5) of the third lens L3 are respectively spaced apart by predetermined intervals.

In the present example, the first lens L1, the second lens L2, and the third lens L3 are made of glass lenses.

In the following, numerical data of the converter lens system 1 as the first embodiment and the assumed single-plate type camera are shown.

| Surface number | Radius of curvature | Interval | Glass type |
|---|---|---|---|
| S0: | INFINITY | 10.300 | |
| S1: | −235.490 | 2.000 | Nd = 1.581, Vd = 40.9 |
| S2: | 38.804 | 0.200 | |
| S3: | 38.668 | 23.949 | Nd = 1.805, Vd = 39.6 |
| S4: | 20.000 | 0.796 | |
| S5: | 20.169 | 4.343 | Nd = 1.581, Vd = 40.9 |
| S6: | −98.280 | 12.676 | |
| S7: | INFINITY | 1.630 | Nd = 1.517, Vd = 64.2 |
| S8: | INFINITY | 1.600 | Nd = 1.544, Vd = 73.5 |
| S9: | INFINITY | 0.400 | Nd = 1.564, Vd = 51.3 |
| S10: | INFINITY | 3.000 | |
| S11: | INFINITY | 0.700 | Nd = 1.517, Vd = 64.2 |

-continued

| Surface number | Radius of curvature | Interval | Glass type |
|---|---|---|---|
| S12: | INFINITY | 1.000 | |
| S13: | INFINITY | | |

In the numerical data, the "radius of curvature" having a positive value indicates a convex shape on the object side, the "radius of curvature" having a negative value indicates a concave shape on the object side, and INFINITY indicates a flat surface.

The "interval" indicates air interval or a thickness of the lens L or the filter f. The "glass type" describes a refractive index and Abbe number in d-line by Nd and Vd, respectively.

The mount surface S0 assumes a B4 mount.

Also, the specification is maximum image height H=5.5 mm and F value=1.47. In this case, units of the "radius of curvature" and the "interval" are "mm".

In the above-described converter lens system 1 as the first embodiment, $H/|fe|=0.0041$ $R1/H=-42.82(-235.490/5.5)$ $L=5.69 \times H$ $BF=3.55 \times H$ $|Nd1-Nd3|=0$ From this point, it can be seen that the converter lens system 1 as the first embodiment satisfies the conditions of Formulas 1 to 6 above.

FIG. 3 is a longitudinal aberration diagram illustrating a spherical aberration, an astigmatism, and a distortion aberration (%) in a case where the converter lens system 1 as the first embodiment is inserted between the imaging lens for the three-plate type camera and the single-plate type camera. Vertical axes are image heights with respect to a ratio of a maximum pupil diameter in the spherical aberration, an astigmatism, and a distortion aberration, respectively.

In FIG. 4, the same longitudinal aberration diagram in a case where an imaging lens for a three-plate type camera is combined with a three-plate type camera is illustrated as a comparison.

In FIGS. 3 and 4, for the spherical aberrations, characteristics are shown when "λ1" is wavelength=656.3 nm, "λ2" is wavelength=587.6 nm, "λ3" is wavelength=546.1 nm, "λ4" is 486.1 nm, and "λ5" is wavelength=435.8 nm, respectively. Also, for the astigmatism, "S" indicates a characteristic of a sagittal plane direction, and "T" indicates a characteristic of a tangential plane direction (meridional plane direction).

From the comparison of FIGS. 3 and 4, it can be seen that the converter lens system 1 of the first embodiment can maintain substantially the same optical performance as the case where the imaging lens for the three-plate type camera is combined with the three-plate type camera, with respect to the spherical aberration, the astigmatism, and the distortion aberration.

2-2. Second Embodiment

FIG. 5 is a diagram for explaining a lens configuration of a converter lens system 1 as a second embodiment.

The converter lens system 1 of the second embodiment is configured with a three-plate-bonded lens by bonding a first lens L1 and a second lens L2 and bonding the second lens L2 and a third lens L3. An image plane side surface (S2) of the first lens L1 comes into close contact with an object side surface (S3) of the second lens L2, and an image plane side surface (S4) of the second lens L2 comes into close contact with an object side surface (S5) of the third lens L3.

Numerical data of the converter lens system 1 as the second embodiment and the assumed single-plate type camera are shown below.

In the present example, the first lens L1, the second lens L2, and the third lens L3 are made of glass. Even in this case, the specification is maximum image height H=5.5 mm and F value=1.47, and a mount surface S0 assumes a B4 mount.

Numerical data of the assumed single-plate type camera are the same as those shown in the first embodiment.

| Surface number | Radius of curvature | Interval | Glass type |
|---|---|---|---|
| S0: | INFINITY | 10.300 | |
| S1: | −230.536 | 2.000 | Nd = 1.581, Vd = 40.9 |
| S2: | 37.875 | 0.000 | |
| S3: | 37.875 | 19.300 | Nd = 1.805, Vd = 39.6 |
| S4: | 22.430 | 0.000 | |
| S5: | 22.430 | 9.750 | Nd = 1.581, Vd = 40.9 |
| S6: | −102.792 | 12.676 | |
| S7: | INFINITY | 1.630 | Nd = 1.517, Vd = 64.2 |
| S8: | INFINITY | 1.600 | Nd = 1.544, Vd = 73.5 |
| S9: | INFINITY | 0.400 | Nd = 1.564, Vd = 51.3 |
| S10: | INFINITY | 3.000 | |
| S11: | INFINITY | 0.700 | Nd = 1.517, Vd = 64.2 |
| S12: | INFINITY | 1.000 | |
| S13: | INFINITY | | |

In the above-described converter lens system 1 as the second embodiment, $H/|fe|=0.0030$ $R1/H=-41.91(-230.536/5.5)$ $L=5.65 \times H$ $BF=3.55 \times H$ $|Nd1-Nd3|=0$ Therefore, the converter lens system 1 as the second embodiment satisfies the conditions of Formulas 1 to 6 above.

Similar to FIGS. 3 and 4, FIG. 6 is a longitudinal aberration diagram illustrating a spherical aberration, an astigmatism, and a distortion aberration (%) in a case where the converter lens system 1 as the second embodiment is inserted between the imaging lens for the three-plate type camera and the single-plate type camera.

From the comparison of FIG. 4, it can be seen that the converter lens system 1 of the second embodiment also can maintain substantially the same optical performance as the case where the imaging lens for the three-plate type camera is combined with the three-plate type camera, with respect to the spherical aberration, the astigmatism, and the distortion aberration.

3. CONCLUSION OF EMBODIMENTS

The converter lens system 1 of the present embodiment, in which the first lens L1 being a negative lens of which both sides are concave, the second lens L2 being a negative lens of which both the object side and the image plane side are convex toward the object side, and the third lens L3 being a positive lens of which both surfaces are convex are arranged in this order from the object side, is inserted and used between the imaging lens and the camera.

Therefore, due to a ratio of axial peripheral ray height on the object side surface of the first lens L1 and the image plane side surface of the third lens L3, it is possible to generate a positive spherical aberration as the sum in the converter lens system 1.

Therefore, the correction of the spherical aberration, which is likely to occur when the imaging lens and the camera having different standards are used in combination, can be performed by the lens system alone (by the lens of at least three plates). In the imaging system that uses the imaging lens and the camera in combination through the converter lens system 1, it is possible to achieve the miniaturization of the converter lens system 1 as compared to the case where the glass block equivalent to three-plate type prism is mounted, while maintaining excellent optical characteristic when the three-plate type prism of the original design specification is mounted.

Also, the converter lens system 1 of the present embodiment is inserted and used between the single-plate type camera and the imaging lens designed on the assumption that the imaging lens is used in combination with the color separation prism included in the three-plate type camera having three image sensors.

Therefore, the spherical aberration occurring when the imaging lens for the three-plate type camera and the single-plate type camera are used in combination can be corrected by the lens system alone, and it is possible to achieve the miniaturization of the converter lens system 1 while maintaining the excellent optical characteristic of the imaging system.

Furthermore, the converter lens system 1 of the present embodiment substantially has no power.

Therefore, when the converter lens system 1 is inserted and used between the imaging lens and the camera, the enlargement or reduction of the image does not substantially occur.

Hence, it is possible to appropriately cope with the standard based on the assumption that an image sensor having a predetermined size is used.

When fe is the focal length for e-line of the converter lens system 1 and H is the maximum image height of the entire optical system when combined with the imaging lens, the converter lens system 1 of the present embodiment satisfies:

$$H/|fe|<0.03$$

By satisfying the above condition, the power of the converter lens system 1 is an appropriate value considering the variation tolerance of the power because even in the category of the same size standard, an image element having a slightly different effective region size exists and it is configured to perform an aberration correction by a lens system, without providing the prism.

Therefore, it is possible to widen a corresponding width of the converter lens system 1 while suppressing the enlargement/reduction of the image.

Alternatively, the converter lens system 1 of the present embodiment satisfies:

$$H/|fe|<0.01$$

Thus, the power of the converter lens system 1 is a smaller value while being a value considering a difference or a power variation tolerance of the effective region size of the image sensor in the same size standard.

Therefore, it is possible to realize the converter lens system 1 that further suppresses the enlargement/reduction of the image while securing the corresponding width of the converter lens system 1 to a certain degree.

Also, when R1 is the radius of curvature of the object side surface of the first lens L1 and H is the maximum image height of the entire optical system when combined with the imaging lens, the converter lens system 1 of the present embodiment satisfies:

$$-100<R1/H<-25$$

Accordingly, a spherical aberration for offsetting the spherical aberration generated by the imaging lens for the three-plate type camera is generated by the converter lens system 1.

Thus, in a case where the converter lens system 1 is inserted and used between the imaging lens for the three-plate type camera and the single-plate type camera, it is possible to appropriately correct the spherical aberration.

Furthermore, when L is the distance from the apex of the object side of the first lens L1 to the apex of the third lens L3 on the image plane side and H is the maximum image height of the entire optical system when combined with the imaging lens, the converter lens system 1 of the present embodiment satisfies:

$$L>5\times H$$

The lower limit "5×H" of the total length L is a value corresponding to a limit value of imaging performance degradation due to the astigmatism.

Therefore, it is possible to realize the converter lens system 1 that achieves miniaturization by shortening the total length L while maintaining excellent imaging performance.

Furthermore, when BF is the back focus that is the air conversion distance from the apex of the third lens L3 on the image plane side to the image plane and H is the maximum image height of the entire optical system when combined with the imaging lens, the converter lens system 1 of the present embodiment satisfies:

$$BF>3\times H$$

The lower limit "3×H" of the back focus BF is a value that is set considering various mount standards of the single-plate type camera having on color separation prism.

Hence, it is possible to secure relatively long back focus that can cope with the mount standard of the single-plate type camera.

Also, the converter lens system 1 of the present embodiment is configured with a three-plate-bonded lens.

Due to the three-plate-bonded lens, the separation distance among the respective lenses L of the first lens L1, the second lens L2, and the third lens L3 is shortened.

Therefore, it is possible to reduce the total length L, that is, it is possible to achieve the miniaturization of the converter lens system 1.

Also, due to the bonded lens, the position tolerance management of the respective lenses L on the assembly is alleviated, and there is an advantage that can reduce the degradation of the optical performance, such as interfacial ghost or flare occurring in an interface with air. Furthermore, due to the three-plate-bonded lens, it is possible to realize the converter lens system 1 that can reduce the sensitivity to the aberrations of the respective lens L, is easy to manufacture, and can easily maintain high optical performance.

Furthermore, when Nd1 is the refractive index in d-line of the first lens L1 and Nd3 is the refractive index in d-line of the third lens L3, the converter lens system 1 of the present embodiment satisfies:

$$|Nd1-Nd3|<0.05$$

As described above, in the converter lens system 1 of the present embodiment in which the first lens L1 being a negative lens of which both sides are concave, the second lens L2 being a negative lens of which both the image plane side and the object side are convex toward the object side, and the third lens L3 being a positive lens of which both surfaces are convex are arranged in this order from the object side, a magnification chromatic aberration is almost offset at two pairs, that is, a pair of the image plane side surface of the first lens L1 and the object side surface of the second lens L2 and a pair of the image plane side surface of the second lens L2 and the object side surface of the third lens L3 by make the refractive indexes of the first lens L1 and the third lens L3 equal to each other.

Therefore, it is possible to realize the converter lens system 1 that can achieves the suppression of the magnification chromatic aberration.

4. MODIFICATION

The embodiments of the present technology have been described above, but the present technology is not specifically limited to the above examples.

For example, the surface shape and material of each lens L in the above examples, the shape of the lens barrel 2, or the like are merely an example, and appropriate modifications can be made without departing from the scope of the present technology.

Also, the present technology can be applied to a still camera or a film camera as well as a video camera equipped with an image sensor, and can be widely and suitably applied to a general camera, regardless of another moving image/still image or another color/monochrome.

Also, as an example of the bonding of the lenses, in the second embodiment, the first lens L1 and the second lens L2, the second lens L2 and the third lens L3 are bonded. However, among the first to third lenses L1 to L3, only the first lens L1 and the second lens L2, or only the second lens L2 and the third lens L3 can be bonded.

Furthermore, in the converter lens system according to the embodiments of the present technology, in addition to the first to third lenses, another optical element such as a lens having on power (refractive power) may be disposed. In this case, the lens configuration of the converter lens system according to the embodiments of the present technology is substantially configured with three lenses, that is, the first to third lenses.

Note that the effects described herein are only for illustrative purposes and there may be another effect.

It should be understood by those skilled in the art that various modifications, combinations, sub-combinations and alterations may occur depending on design requirements and other factors insofar as they are within the scope of the appended claims or the equivalents thereof.

5. PRESENT TECHNOLOGY

Additionally, the present technology may also be configured as below.

(1) A converter lens system including:
a first lens that is a negative lens of which both surfaces are concave;
a second lens that is a negative lens of which both an image plane side and an object side are convex toward an object side; and
a third lens that is a positive lens of which both sides are convex, wherein the first to third lenses are disposed in this order from the object side, and
the converter lens system is inserted and used between an imaging lens and a camera.

(2) The converter lens system according to (1),
wherein the converter lens system is inserted and used between the imaging lens, which is designed on an assumption that the imaging lens is used in combination with a color separation prism included in a three-plate type camera having three image sensors, and the camera that is a single-plate type camera.

(3) The converter lens system according to (1) or (2),
wherein the converter lens system substantially has no power.

(4) The converter lens system according to any one of (1) to (3),
wherein when fe represents a focal length for e-line of the converter lens system and H represents a maximum image height of an entire optical system when combined with the imaging lens, the converter lens system satisfies:

$$H/|fe|<0.03$$

(5) The converter lens system according to (4),
wherein the converter lens system satisfies:

$$H/|fe|<0.01$$

(6) The converter lens system according to any one of (1) to (5),
wherein when R1 represents a radius of curvature of the object side of the first lens and H represents a maximum image height of an entire optical system when combined with the imaging lens, the converter lens system satisfies:

$$-100<R1/H<-25$$

(7) The converter lens system according to any one of (1) to (6),
wherein when L represents a distance from an apex of the object side of the first lens to an apex of the image plane side of the third lens and H represents a maximum image height of an entire optical system when combined with the imaging lens, the converter lens system satisfies:

$$L>5\times H$$

(8) The converter lens system according to any one of (1) to (7),
wherein when BF represents back focus, which is an air conversion distance from an apex of an image plane side of the third lens to an image plane, and H represents a maximum image height of an entire optical system when combined with the imaging lens, the converter lens system satisfies:

$$BF>3\times H$$

(9) The converter lens system according to any one of (1) to (8),
wherein the converter lens system is configured with a three-plate-bonded lens.

(10) The converter lens system according to any one of (1) to (9), wherein when Nd1 represents a refractive index for d-line of the first lens and Nd3 represents a refractive index for d-line of the third lens, the converter lens system satisfies:

$|Nd1-Nd3|<0.05$

(11) The converter lens system according to any one of (1) to (10), wherein the optical elements substantially having no power is disposed.

What is claimed is:

1. A converter lens system, comprising:
   a first negative lens that has a first concave surface towards an object side of the converter lens system and a second concave surface opposite to the first concave surface;
   a second negative lens that has a third surface bonded to the second concave surface of the first negative lens, and a fourth surface opposite to the third surface,
      wherein each of the third surface and the fourth surface is convex towards the object side; and
   a positive lens that has:
      a fifth surface that is convex towards the object side and adjacent to the fourth surface of the second negative lens, and
      a sixth convex surface that is opposite to the fifth surface, wherein the sixth convex surface is convex towards an image plane side of the converter lens system;
   a first connector configured to detachably connect the object side of the converter lens system to a first camera system; and
   a second connector configured to detachably connect the image plane side of the converter lens system to a second camera system,
   wherein the converter lens system satisfies:

$|Nd1-Nd3|<0.05$, where Nd1 represents a first refractive index for d-line of the first negative lens and Nd3 represents a second refractive index for d-line of the positive lens.

2. The converter lens system according to claim 1,
   wherein the first camera system comprises an imaging lens in combination with a color separation prism of a three-plate type camera that includes three image sensors, and
   wherein the second camera system comprises a single-plate type camera.

3. The converter lens system according to claim 1, wherein the fourth surface of the second negative lens is bonded to the fifth surface of the positive lens.

4. The converter lens system according to claim 1, wherein the converter lens system substantially has no power.

5. A converter lens system, comprising:
   an object side connector configured to detachably connect to a first camera system;
   a first negative lens that has a first concave surface towards an object side, and a second concave surface opposite to the first concave surface;
   a second negative lens that has a third surface bonded to the second concave surface of the first negative lens, and a fourth surface opposite to the third surface,
   wherein each of the third surface and the fourth surface is convex towards the object side;
   a positive lens that has:
   a fifth surface that is convex towards the object side and bonded to the fourth surface of the second negative lens, and
   a sixth convex surface that is opposite to the fifth surface, wherein the sixth convex surface is convex towards an image plane side of the converter lens system; and
   an image plane side connector configured to detachably connect to a second camera system.

* * * * *